United States Patent [19]

Phalan

[11] 4,008,429
[45] Feb. 15, 1977

[54] VOLTAGE TRANSLATOR FOR SOLID STATE WATCH

[75] Inventor: James M. Phalan, Sunnyvale, Calif.

[73] Assignee: Intel Corporation, Santa Clara, Calif.

[22] Filed: Mar. 31, 1975

[21] Appl. No.: 563,311

Related U.S. Application Data

[63] Continuation of Ser. No. 390,776, Aug. 23, 1973, abandoned.

[52] U.S. Cl. .............................. 323/17; 58/23 A; 321/2; 323/22 T; 323/DIG. 1
[51] Int. Cl.² .......................................... G05F 1/56
[58] Field of Search ............ 58/23 A, 23 BA, 50 R; 321/2; 323/17, 19, 22 T, DIG. 1

[56] References Cited

UNITED STATES PATENTS

| | | | |
|---|---|---|---|
| 3,215,925 | 11/1965 | Rieke | 323/19 X |
| 3,229,158 | 1/1966 | Jensen | 321/2 X |
| 3,327,202 | 6/1967 | Mills | 323/DIG. 1 |
| 3,381,202 | 4/1968 | Loucks et al. | 321/2 |
| 3,497,794 | 2/1970 | Fredrickson et al. | 323/22 T |
| 3,523,239 | 8/1970 | Heard | 323/DIG. 1 |
| 3,564,384 | 2/1971 | Adler | 323/DIG. 1 |
| 3,571,697 | 3/1971 | Phillips | 323/DIG. 1 |
| 3,641,424 | 2/1972 | Kuykendall | 323/DIG. 1 |
| 3,760,582 | 9/1973 | Thiess et al. | 58/23 A |
| 3,815,354 | 6/1974 | Strocka et al. | 58/50 R |
| 3,835,368 | 9/1974 | Williams | 323/DIG. 1 |

Primary Examiner—A. D. Pellinen
Attorney, Agent, or Firm—Spensley, Horn & Lubitz

[57] ABSTRACT

A voltage translator for increasing the voltage available from the battery of an electrically energized watch so as to supply power for components requiring higher operating voltages. An inductor is switched into and out of the battery circuit using sharp pulses derived from the watch time base. The energy stored in the magnetic field of the inductor during the charge time is transferred to a storage capacitor as the field collapses. The rapid collapse of the field induces a high reverse voltage in the inductor so that the voltage across the storage capacitor increases after repeated pulses to a predetermined, relatively high value at which time a blocking circuit prevents further pulsing of the inductor, thereby automatically regulating the voltage.

10 Claims, 4 Drawing Figures

VOLTAGE TRANSLATOR FOR SOLID STATE WATCH

This is a continuation of application Ser. No. 390,776, filed Aug. 23, 1973, now abandoned.

BACKGROUND OF THE INVENTION

1. Field of the Invention

This invention relates to electronic timepieces and more particularly to circuits for achieving the voltages required to operate electronic timepiece components which require higher than battery voltage.

2. Prior Art

The voltage translator of this invention is useful for converting a low battery voltage to the relatively high voltage necessary for operating a liquid crystal display in a crystal oscillator controlled watch. A serious problem exists in the design of electrically energized watches in that very little space is available for the power source, and consequently the power available to operate the watch is seriously limited. Typically one or at the most two 1.5 volt cells are used to drive the watch and the current drain must be held to an absolute minimum in order to achieve a battery life of at least one year, the life deemed necessary in order to have a salable product.

Various schemes have been developed to operate relatively standard mechanical watches from such a limited energy source and reasonably satisfactory timepieces have been made. Recently, a demand for watches more accurate than previously available has appeared, probably as a result of the modest increase in accuracy attained by some of the electrically energized watches over the traditional mainspring driven watches.

Quartz crystal oscillators are known to be highly accurate, and this characteristic has led to consideration of crystal oscillator control of mechanical movements to achieve the desired accuracy, and, as a consequence, to the possibility of direct digital readouts using light emitting diodes or liquid crystal displays rather than standard watch faces with hands.

Liquid crystal displays are an attractive choice for a readout since they require very little operating power and are susceptible to control by solid state logic. Unfortunately, the lower level of voltage required to operate existing displays is about 10 volts, with 15 volts being a desirable operating voltage.

There are numerous methods of increasing direct current voltages known to the prior art, but for the most part the complexity and inefficiency factors prohibit their use in the small space and limited energy environment of a battery operated watch.

The invented circuit converts the low voltage available (commonly 3 volts) to the 15 volts required to operate the display using a minimum volume of components and resulting in a maximum of efficiency.

BRIEF SUMMARY OF THE INVENTION

The small space available, with the consequent limitation on the energy source, mandates that any circuitry to be utilized in conjunction with an electrically driven watch be highly efficient and, at the same time, contain a minimum number of large components. Battery voltage is generally limited to 3 volts, and only a few tens of microamperes of current drain can be tolerated if a satisfactory battery life is to be achieved.

A minimum of 10 volts and preferably 15 volts is required to operate liquid crystal displays such as are being used in some current and projected watch designs. The present invention is a circuit for converting the 3 volt battery supply to 15 volts for operation of such displays or other circuits requiring higher than battery voltage.

Pulses from the oscillator used as the time base for the watch are utilized to switch an inductor across the supply voltage so as to cause a magnetic field to build up in the core of the inductor, and then to quickly disconnect the charging circuit so that a large reverse voltage is induced in the inductor winding by the collapsing field. This induced voltage is applied across an output capacitor through a diode which prevents the capacitor from discharging back into the inductor after the field has collapsed.

Each pulse causes a fixed amount of energy to be transferred to the output capacitor until the capacitor voltage rises to slightly over 15 volts. At this point a blocking circuit is activated which prevents subsequent pulses from being applied to the inductor until the capacitor voltage again drops to about 15 volts and the charging circuit again becomes operative.

The blocking circuit is so arranged that it cannot block the charging circuits during the period of a pulse so that pulse width modulation of the pulses which could result in switching inefficiencies is avoided.

The efficiency of the circuit is very high inasmuch as no power is drawn during the time between pulses, and inductances are available which return a high proportion of the energy stored to the circuit.

DETAILED DESCRIPTION OF THE INVENTION

Figure 1:
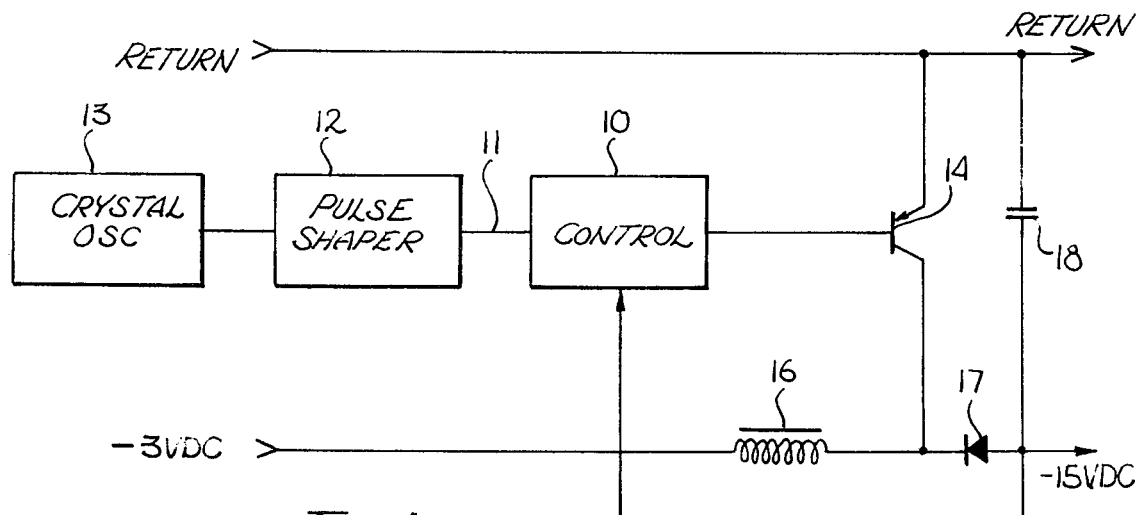
FIG. 1 is a simplified schematic diagram of a first preferred embodiment of the voltage translator of this invention.

Referring first to FIG. 1 where a simplified schematic diagram of a first preferred embodiment of the present invention is shown with the control circuit 10 receiving pulses on its input line 11 from pulse shaper 12 which in turn is receiving signals from crystal oscillator 13. The crystal oscillator in a typical crystal controlled watch operates at a frequency of the order of 32 KHz and is divided down to a relatively low frequency for operating the display logic. A convenient frequency for operating the display logic is 64 Hz, and this frequency is used as a matter of convenience as the trigger frequency in the explanation of the first embodiment of the voltage translator of this invention. The voltage translator is not frequency sensitive, and a wide range of trigger frequencies would yield satisfactory results.

In the particular embodiment described, input to the control section 10 comprises positive pulses at the 64 Hz rate, each pulse being 15 microseconds in duration. Assuming for the moment that capacitor 18 is not charged to a full 15 volts, each pulse turns transistor 14 on for 15 microseconds and current flows in inductor 16 from the battery, not shown. As current flows in inductor 16, energy is abstracted from the electric circuit and stored in the form of a magnetic field about the inductor. Diode 17 prevents capacitor 18 from discharging through transistor 14 or back through inductor 16 and the battery.

At the end of the 15 microsecond pulse, transistor 14 is turned off. The trailing edge of the pulse is made intentionally sharp so that transistor 14 shuts off rapidly. The field around inductor 16 then collapses since there is no current to support it, and a large voltage is induced in the winding of inductor 16 by the collapsing field. The polarity of this voltage is such that it adds to the battery voltage and thus, if the cut off of transistor 14 is sufficiently sharp, the voltage will rise above the voltage on capacitor 18 and the inductor 16 will supply current to charge capacitor 18.

Repeated pulses will cause capacitor 18 to charge up to 16 volts at which time a blocking circuit causes the charging circuit to stop feeding pulses to transistor 14 and capacitor 18 will stop charging until its voltage drops, due to power consumption from the liquid crystal display, and the charging mode is resumed.

Figure 2:
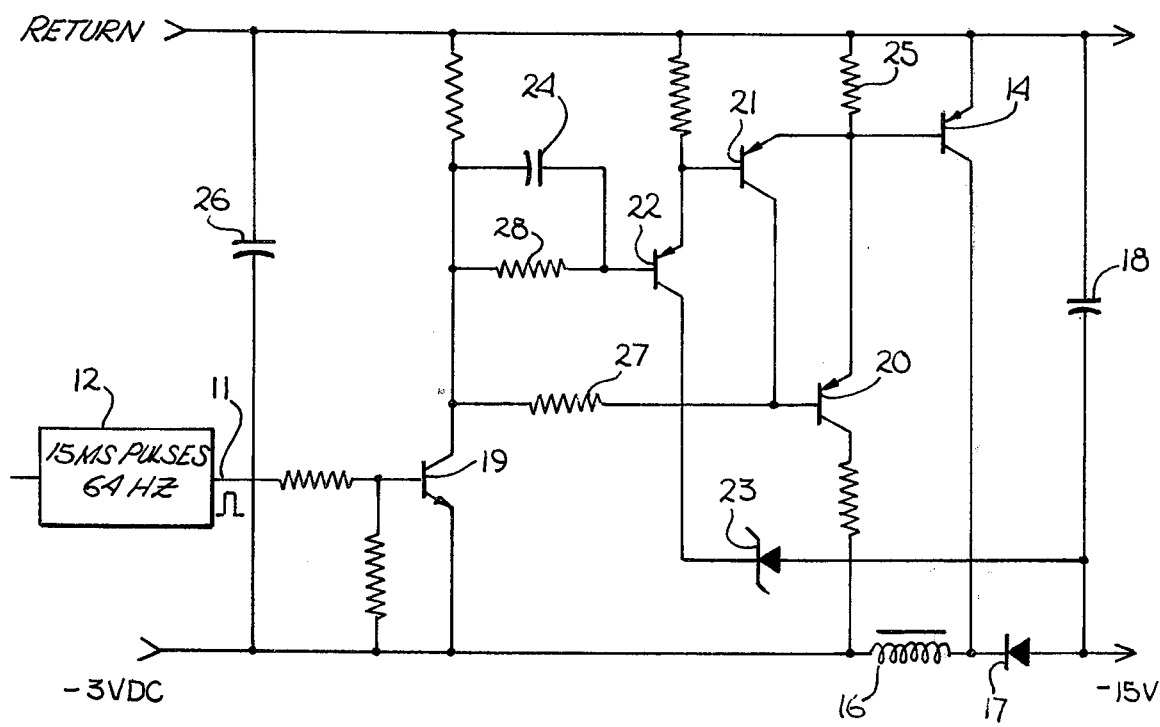
FIG. 2 is a detailed schematic diagram of the first preferred embodiment of the voltage translator of this invention.

In FIG. 2 the pulses from pulse shaper 12 are seen being fed on line 11 to transistor 19 which functions as a buffer amplifier and to provide a low impedance source for the translator so that sharp rise and fall times can be maintained with attendant high efficiency.

If capacitor 18 is charged to less than 15 volts, the pulses are fed through transistor 20 to transistor 14 charging and discharging the inductor 16 as previously described. The charge on capacitor 18 thereby tends to increase. As it rises over 15 volts, zener diode 23, which is a 15 volt diode, breaks down causing the excess voltage to appear across transistor 22. The pulses on the collector of transistor 19 are coupled to the base of transistor 22 through the parallel combination of resistor 28 and capacitor 24, and when transistor 22 is activated due to the voltage on capacitor 18 being higher than the zener voltage of zener diode 23, the pulses are fed through transistor 22 to the base of transistor 21, turning it on. When transistor 21 is on it presents a low impedance to pulses coming from transistor 19 through resistor 27 attenuating them so that they are unable to turn transistor 20 on, and therefore the charging action of transistor 14 will be inhibited until the voltage on capacitor 18 drops to the point that the inhibiting circuit just described becomes ineffective. The inhibiting circuit is active when the voltage across capacitor 18 exceeds the zener voltage of zener diode 23 by about ½ volt or more. For proper inhibiting circuit operation, transistor 21 should be on before the control pulse from transistor 19 through resistor 27 turns on transistor 20. Capacitor 24 aids in keeping the time constants in the path through transistor 22 and 21 short with respect to the time constant through resistor 27 so as to assure the proper sequence.

If the voltage across capacitor 18 at any particular moment is very close to the blocking circuit activation voltage, it might be possible that with transistor 20 on, circuit noise could activate the blocking circuit and cause a pulse width type of operation rather than the on-off type operation described. In order to prevent this type of action, the emitter of transistor 21 is connected to the emitter of transistor 20 instead of to the positive battery terminal where it might have been connected. With the connection as shown, when transistor 20 is conducting, the voltage drop across resistor 25 increases the activation voltage of the blocking circuit substantially, thereby precluding the problem mentioned.

When transistor 21 is on due to the presence of an input pulse (the capacitor 18 being fully charged), some current will flow through the path formed by resistor 25, transistor 21, resistor 27, and transistor 19. Resistor 27 must be made large enough so that this current will not result in enough voltage drop across resistor 25 to cause transistor 14 to turn on.

Typical batteries in use in electric watches have a relatively high internal impedance and do not have the capability of supplying the high peak currents necessary to transfer the necessary amount of energy per pulse to the inductor. Capacitor 26 supplies the peak current required by the circuit and is continually charged by the battery.

In order to supply the excitation necessary to operate a liquid crystal display for a watch, a current capability of about 3 microamperes should be available at the excitation voltage of 15 volts. Since the pulse duty cycle is about 0.001 (15 microsecond pulse at 64Hz), the average current during the pulse drawn from a 3 volt supply by the inductor 16 must be about 15 milliamperes, or about 30 milliamperes peak, since the current rise will be approximately linear over the short charging time. An inductor 16 of 1.5 millihenry inductance is the mathematically correct value of inductance required to achieve this charging current, but in order to compensate for current losses and provide a safety factor, a somewhat smaller inductor should be used.

Figure 3:
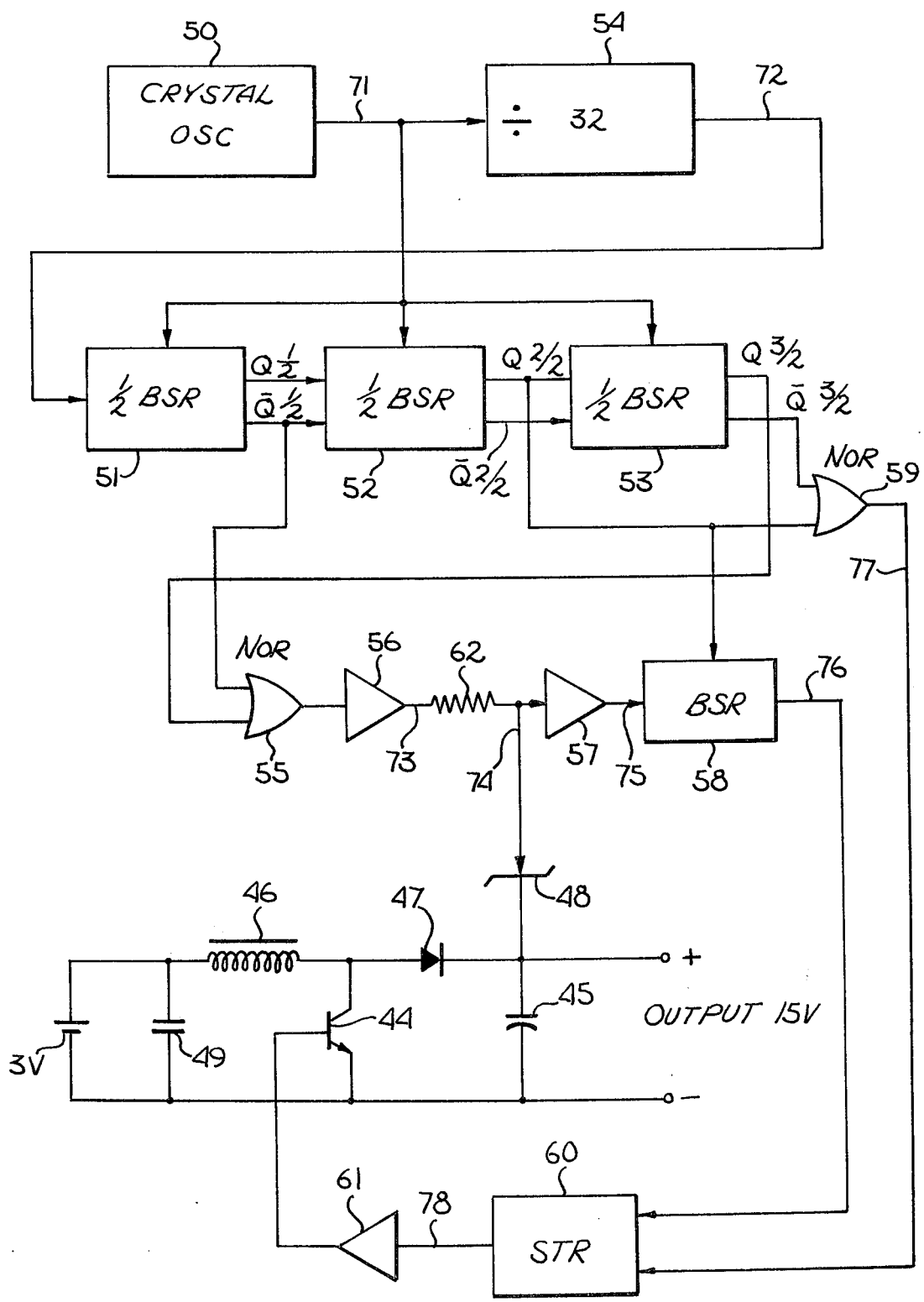
FIG. 3 is a block diagram of a second preferred embodiment of the present invention.

A second preferred embodiment of the present invention is shown in block diagram form in FIG. 3. The means for converting pulses of low voltage to a higher D.C. voltage in this embodiment utilizes the same circuitry as does the first embodiment, that is, components equivalent to transistor 14, capacitors 18 and 26, inductor 16, diode 17 and zener diode 23 appear in the second embodiment as transistor 44, capacitors 45 and 49, inductor 46, diode 47, and zener diode 48. The difference between the two embodiments resides in the difference in means for generating the control pulses which are fed to the base of the control transistor 14 or 44. One advantage of the second embodiment is that the circuit disclosed is easily mechanized in the form of an MOS integrated circuit resulting in an economical structure which consumes a minimum of power.

Referring now to the block diagram of FIG. 3 wherein a crystal oscillator 50 is shown oscillating at 32 KHz, this can be and usually is the oscillator which provides the control frequency for the time keeping functions of the watch, but any oscillator could be used to drive the pulse control circuits to be described.

The 32 KHz output at 71 is used as the clock frequency to three ½ bit shift registers 51, 52, and 53. The signal input to register 51 is at 1024 Hz, the 32 KHz signal having been divided by 32 in divider 54. The relationships of the signals at 71, 72, and the outputs of shift registers 51, 52, and 53 can be seen in FIG. 4. The outputs of register 51 are $Q_{1/2}$ and $\overline{Q}_{1/2'}$ of register 52 $Q_{2/2}$ and $\overline{Q}_{2/2}$ and of register 53 $Q_{3/2}$ and $\overline{Q}_{3/2'}$ $\overline{Q}$ indicating an output inverse to Q. The shift register outputs are seen to be 1024 Hz square waves delayed by ½ cycle of clock frequency (32 KHz) per half bit.

Figure 4:
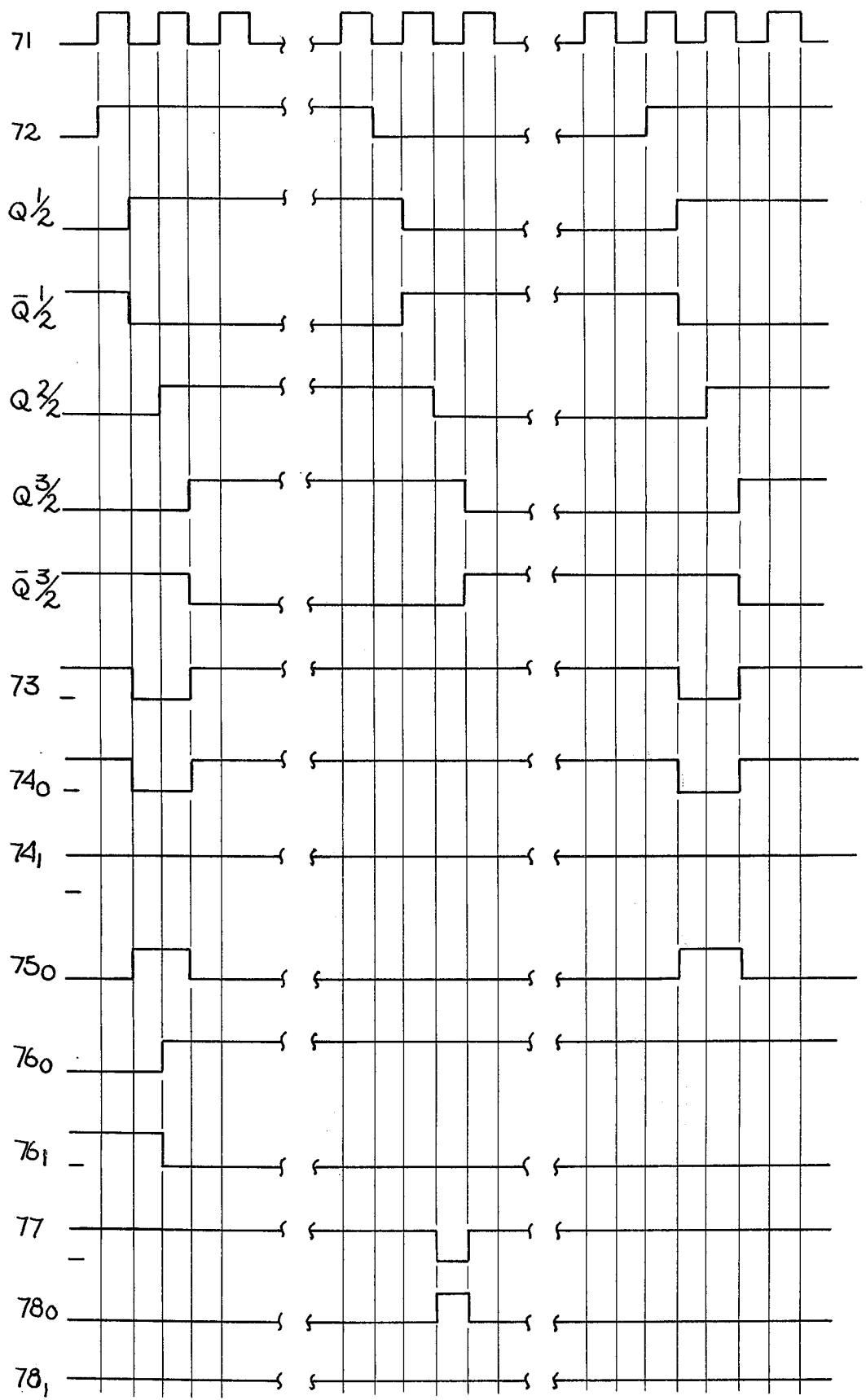
FIG. 4 is a series of curves showing the waveforms at various points in the circuit of FIG. 3.

$\overline{Q}_{1/2}$ and $Q_{3/2}$ are combined in NOR gate 55 and fed through buffer 56 and resistor 62 to the anode of zener diode 48. The waveform is a series of pulses 30 microseconds (1 cycle) long at the 32 KHz clock frequency, and appear once per (1024 Hz) cycle. The waveform output of buffer 56 can be seen as curve 73 of FIG. 4. The purpose of these pulses is to enable the strobe circuit to fire, as will be described presently. If capacitor 45 is charged up to near the zener voltage of zener 48, the enabling pulse appearing at the output of buffer 56 (curve 73) will be dropped across resistor 62 and not appear at the input of inverter 57. Curve $74_0$ in FIG. 4 shows the waveform at this point, the subscript 0 meaning that the voltage on capacitor 45 is low and pulses appear at the input of phase inverter 57. The voltage at the input of phase inverter 57 when capacitor 45 is charged to full voltage is shown as curve $74_1$. Phase inverter 57 not only inverts the signal 74, but is a threshold device in that if only small pulses are transmitted through resistor 62, no output will be derived from phase inverter 57, but if the pulses are above a certain small amplitude, they will be transmitted through inverter 57 with high amplitude, the amplitude being independent of the amplitude of the input pulse. This is easily accomplished using a prior art circuit known as an MOS inverter. The output of phase inverter 57, when capacitor 45 is not at full charge, is shown as curve $75_0$. When capacitor is fully charged, the output of inverter 57 will be zero at all times.

The output of phase inverter 57 is fed to one bit shift register 58. This register is clocked at a 1024 Hz rate by $Q_{2/2}$, a square wave at 1024 Hz delayed by one full bit at the 32 KHz clock frequency, or 30 microseconds. The output of register 58 is shown as curves $76_0$ and $76_1$, $76_0$ being the curve when enabling pulses are being transmitted through inverter 57 to shift register 58. The condition shown at the beginning of the curve $76_0$ is the condition which would obtain if the previous pulse had not been transmitted through inverter 57. Curve $76_1$ is the output of shift register 58 when no pulses are being received at the input of register 58, the initial condition being that the last pulse from buffer 56 had been transmitted to the input of register 58. It is seen that the shift register output is high and remains high so long as it is receiving pulses from inverter 57, but drops to low and remains low when the pulses stop (that is, when capacitor 45 charges up to the point that zener diode 48 prevents pulses from being transmitted.

$Q_{3/2}$ and $Q_{2/2}$ are combined in NOR gate 59 resulting in 15 microsecond pulses at a 1024 Hz rate phased as shown in FIG. 4 curve 77. Strobe 60 is a logic circuit which will give a positive output whenever input 77 is low and input 76 is high. Thus the strobe 60 will feed a series of 15 microsecond long pulses to buffer 61 so long as input 76 is high (when capacitor 45 is not fully charged), and will cease feeding pulses when input 76 is low (when capacitor 45 is fully charged). Buffer 61 feeds any pulses received from the strobe to the base of transistor 44 and the charging of capacitor 45 with voltage generated by the collapsing field of inductor 46 proceeds in the same manner as previously described for the embodiment of FIGS. 1 and 2.

The charging circuit polarities are reversed in the embodiment of FIGS. 3 and 4 with respect to that shown in FIGS. 1 and 2 to indicate that similar results will be obtained with either polarity and the particular polarity used will depend primarily on matters of convenience to the designer of the particular device being fabricated and not on any limitation of the invention.

At first glance it may seem that the embodiment of FIGS. 3 and 4 is complicated, but the oscillator dividers, shift registers and logic elements described are easily mechanized on an integrated circuit using complementary MOS devices resulting in extremely low power consumption and small size. This portion of the circuit can be fabricated on a chip measuring 56 × 69 mils with a power dissipation of only 30 nanowatts in the logic circuitry and 2.5 microwatts in the oscillator.

What has been described is a novel voltage translator for use in providing an increased D.C. voltage to operate some components of a battery operated watch. The invention has been explained in connection with two presently preferred embodiments, but it should be understood that the preferred embodiments are shown for purposes of example only, and various modifications can be made within the spirit of the present invention as defined by the appended claims.

I claim:
1. In a power supply of the type including a battery, an inductor, an electrically operated switch for alternately connecting and disconnecting said inductor to said battery, and a capacitor charged by the voltage generated as the magnetic field around said inductor collapses, a regulator which comprises:
   a. means for generating a first repetitive signal;
   b. means for generating a second repetitive signal, said second repetitive signal having the same repetition rate as said first repetitive signal but said second repetitive signal being advanced in time with respect to said first repetitive signal;
   c. means responsive to the magnitude of the charge on said capacitor for attenuating said second repetitive signal; and
   d. means response to the amplitude of said second repetitive signal for coupling said first repetitive signal to said switch.

2. The power supply regulator of claim 1 where said means responsive to the magnitude of charge on said capacitor attenuates said second repetitive signal when said charge exceeds a predetermined value and where said means for coupling said first repetitive signal to said switch will couple said first repetitive signal to said switch only when said second repetitive signal has been attenuated.

3. The power supply regulator of claim 2 where said means for attenuating said second repetitive signal comprises a zener diode coupled to said capacitor in series connection, said second repetitive signal being coupled to said series connection whereby said series connection will present a low shunt impedance to said second repetitive signal when said capacitor is charged to substantially the zener voltage of said zener diode thereby attenuating said second repetitive signal.

4. The power supply regulator of claim 3 where said first and second repetitive signals are derived from the timekeeping circuit of a timepiece and comprise pulses short with respect to the time between pulses.

5. The power supply regulator of claim 4 where said first and second repetitive signals and the time differential between them are established by the action of a plurality of shift registers and logic gates.

6. In a power supply for a watch of the type including a battery, an inductor, an electrically operated switch for alternately connecting and disconnecting said inductor to said battery, and a capacitor charged by the voltage generated as the magnetic field around said inductor collapses, a regulator which comprises:
   a. means for generating voltage at a first frequency;
   b. a frequency divider for obtaining a voltage at a second frequency, said second frequency being a sub-multiple of said first frequency;

c. a plurality of one half bit shift registers in series clocked at said first frequency and coupled to the output of said frequency divider whereby a plurality of signals at said second frequency will be generated, each successive one being delayed by one half cycle of said first frequency from the previous one;

d. first and second gating means coupled to said shift registers for generating a pair of pulses for each cycle of said second frequency, said pulses being one half cycle long at said first frequency, the second of said pair of pulses being approximately one half cycle of said second frequency ahead of the first of said pair of pulses in time sequence;

e. means for attenuating the second of said pair of pulses when said capacitor is charged to a predetermined value; and f. third gating means for coupling the first of said pair of pulses to said switch when the second of said pair of pulses is being attenuated.

7. The regulator of claim 6 where the means for attenuating the second of said pair of pulses comprises a zener diode in series connection with said capacitor, said zener diode and capacitor in series connection presenting a low impedance to the second of said pair of pulses when said capacitor is charged to substantially the zener voltage of said zener diode thereby attenuating the second of said pair of pulses.

8. The regulator of claim 7 where said first frequency is derived from the timekeeping circuit of said watch.

9. A regulated timepiece power supply comprising:
a. a series circuit comprising a battery, an inductor and a switch;
b. a capacitor coupled to said series circuit; and
c. means for maintaining the charge on said capacitor at a predetermined value, said means including a source of repetitive electrical signals coupled to said switch to cause said switch to open and close repetitively during a single charging period as long as the charge on said capacitor remains below said predetermined value, whereby a voltage larger than the voltage of said battery will appear across said inductor each time said switch opens to provide a series of charges to said capacitor;

d. means responsive to the charge on said capacitor for generating an inhibiting signal when the charge on said capacitor exceeds a predetermined value; and e. means responsive to said inhibiting signal for preventing said repetitive signals from closing said switch, said means including a first transistor adapted to couple said repetitive pulses to said switch and a second transistor having its emitter and collector coupled to the emitter and base respectively of said first transistor, said inhibiting signal being coupled to the base of said second transistor when the charge on said capacitor exceeds a predetermined value whereby said second transistor will present a low impedance across the emitter and base of said first transistor preventing said first transistor from coupling said repetitive signal to said switch.

10. The power supply of claim 9 where said means for generating said inhibiting signal comprises:
a. a third transistor, said third transistor having its emitter coupled to the base of said second transistor and its base coupled to said source of repetitive signal; and
b. a zener diode coupled to the collector of said third transistor and to said capacitor whereby when the voltage on said capacitor exceeds the breakdown voltage of said zener diode said third transistor will couple said inhibiting signal to said second transistor.

* * * * *